Oct. 12, 1965     B. J. PLEISS, JR     3,211,934
DYNAMOELECTRIC OVERLOAD PROTECTOR MEANS
Filed April 4, 1962     2 Sheets-Sheet 1

INVENTOR.
Bernard J. Pleiss, Jr.
BY
Albert H. Reuther
HIS ATTORNEY

Oct. 12, 1965   B. J. PLEISS, JR   3,211,934
DYNAMOELECTRIC OVERLOAD PROTECTOR MEANS
Filed April 4, 1962   2 Sheets-Sheet 2

INVENTOR.
Bernard J. Pleiss, Jr.
BY
Albert H. Reuthe
HIS ATTORNEY

United States Patent Office 3,211,934
Patented Oct. 12, 1965

3,211,934
DYNAMOELECTRIC OVERLOAD PROTECTOR MEANS
Bernard J. Pleiss, Jr., Dayton, Ohio, assignor to General Motors Corporation, Detroit, Mich., a corporation of Delaware
Filed Apr. 4, 1962, Ser. No. 185,148
6 Claims. (Cl. 310—68)

This invention relates to overload protection and, more particularly, to an environmental modifier for thermostatic switching control.

An object of this invention is to provide a new and improved thermostatic overload protection means having an additional modifying branch of an actuating portion thereof to enhance sensitivity and scope of control.

Another object of this invention is to provide a thermostatic switch means with a temperature sensitive actuating member to be placed in proximity to a device to be controlled and an environment-responsive modifying means secured to the actuating member for added protective control.

Another object of this invention is to provide overload protection for multiple windings of a single dynamoelectric machine such as a motor which can have main and phase as well as polyphase winding arrangement requiring only a single thermostatic switch means with a fluid-actuated bellows-type cooperable contact portion as well as at least one temperature sensitive actuating member such as a capillary tube means in effect having two portions thereof in proximity to the multiple windings controlled with a mid-point connection thereto for better over-all protection against possible fault and overload in addition to single phase locked rotor conditions for more than only a part of the winding arrangement though requiring only the single thermostatic switch means.

A further object of this invention is to provide improved overload protection for a three phase dynamoelectric machine such as a motor having a winding arrangement of which each phase is wound series Y with a pair of conductors or wires in parallel and modified by having only one of these wires from each phase connected to a separate Y though protector means have at least one temperature sensitive actuating member in physical proximity to the winding arrangement and one auxiliary modifier thereto electrically to include all phases for protection against not only combinations of single phase locked rotor conditions but also additional conditions of fault and overload individual in any one of the phases though requiring only one modified protector means.

Another object of this invention is to provide specific improvement in overload protection for a polyphase dynamoelectric machine such as a motor having only a single thermostatic switch means including a pair of make-break electrical contacts at least one of which is movable in response to change in pressure due to fluid expansion upon predetermined heating thereof as contained in a metal probe attached to a switch housing thus having common electrical connection therewith as well as having an enlarged fluid-containing tubular portion fitted physically in proximity to end turns of polyphase winding means including a pair of corresponding conductors or wires in each phase of which only one of these wires from each phase is connected to a common electrical juncture and the wires per se are series connected with each other with an opposite end of the remaining wire connected to a separate common connection electrically though only such wire physically is secured substantially centrally into a tapped connection along a peripheral outer surface of the enlarged fluid-containing tubular portion.

Further objects and advantages of the present invention will be apparent from the following description, reference being had to the accompanying drawings wherein preferred embodiments of the present invention are clearly shown.

Figure 3:
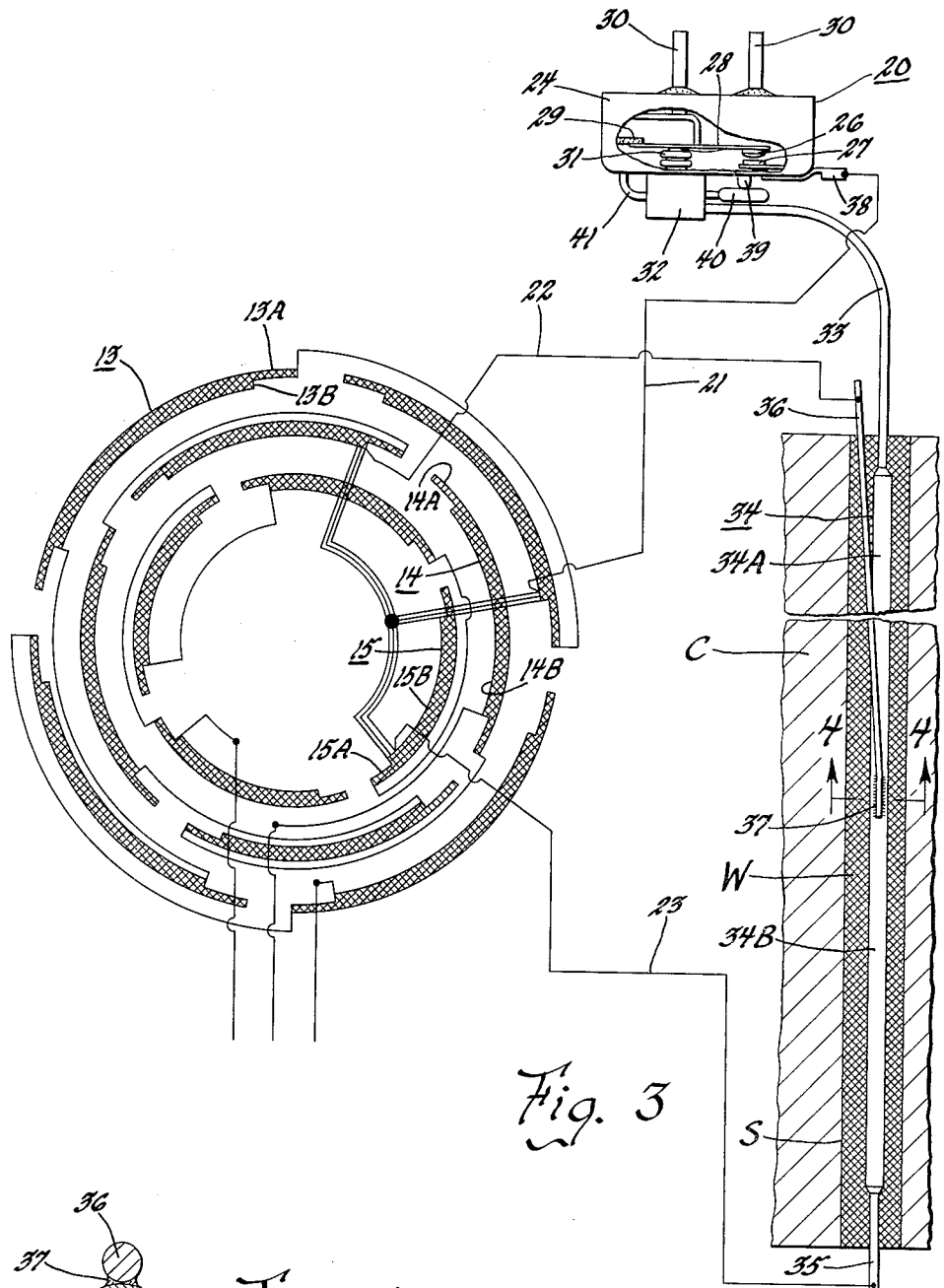

FIGURE 3 provides a diagrammatic layout of polyphase winding arrangement and connection to an improved overload protector means having a temperature sensitive actuating member with a tapped probe connection thereto in accordance with the present invention.

Figure 4:
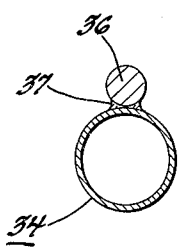

FIGURE 4 is a cross-sectional view of the tapped probe connection taken along line 4—4 in FIGURE 3.

Figure 1:
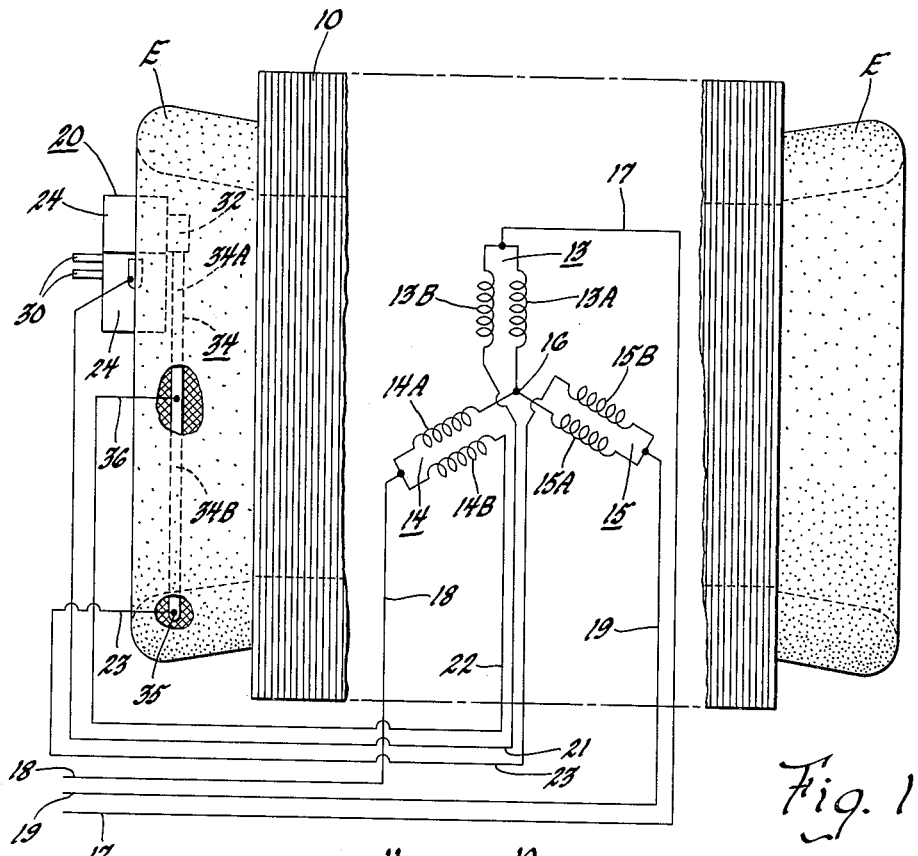
FIGURE 1 is an elevational and schematic illustration of arrangement of components for improved dynamoelectric machine overload protection in accordance with the present invention.

In FIGURE 1 there is provided elevational and schematic illustration of stator components for a dynamoelectric machine. A rotor has been omitted from the view for purposes of clarity, though it is to be understood that such a rotor can be suitably journalled for rotation peripherally within the arrangement of stator components adapted to be housed by a suitable frame and end plates also not shown. The dynamoelectric machine includes a stator means having a plurality of laminations 10 formed of sheet metal stampings having slots 11 extending radially therein as defined by teeth 12 therebetween. A plurality of stator winding means can be fitted or arranged to be positioned in certain locations as to the slots 11 and these winding portions, as seen more particularly in views of FIGURES 2 and 3, can include a first phase winding portion 13 which can include multiple segments of concentrically arranged coils fitted into the bottoms or radially outer locations of the slots 11. A second phase winding portion 14 can be fitted into an intermediate location in the slots 11 and is suitably insulated from the first phase winding portion 13. A third phase winding portion 15 also includes such segments concentrically fitted as one or more coils to radially inner locations of the slots 11 and again a suitable insulating means such as a piece of H-shaped insulating material of suitable plastic commercially available as Mylar can be fitted to the slots of the stator laminations aligned relative to each other. Physically, the multi-coil winding arrangement or polyphase winding means includes opposite end turn portions E shown in FIGURE 1. Electrically, the polyphase winding arrangement having such physical end turn portions E, the first phase winding portion 13 having concentrically arranged coils 13A and 13B as indicated in views of FIGURES 1 and 3, the second or intermediate phase winding 14 including concentric coils 14A and 14B also shown in views of FIGURES 1 and 3 as well as the third and final phase winding portion 15 having concentric coils 15A and 15B as indicated in views of FIGURES 1 and 3. Each of the phase winding portions 13, 14 and 15 as illustrated in the drawings can be wound series Y with a pair of conductors or wires in parallel. The base or larger coil portion such as 13A, 14A and 15A can be connected to a common juncture or first Y connection 16 best seen in the illustration of FIGURE 1. An opposite end of each of the coils 13A, 14A and 15A is connected to a corresponding end of the coils 13B, 14B and 15B as well as three-wire power supply connections 17, 18 and 19, respectively.

A thermostatic switch means generally indicated by numeral 20 provides a separate juncture or second Y connection for leads 21, 22 and 23 joined to remaining ends of the inner concentric coils 13B, 14B and 15B, respectively. The thermostatic switch means 20 includes a metal housing 24 having a movable contact 26 and a fixed contact 27 as illustrated in FIGURE 3. It is to be understood that specific arrangement of these contacts 26–27 can be varied so long as the movable contact is carried by a flexible arm or member 28 journalled or carried by a support 29 suitably insulated from the metal case or housing 24 and electrically joined to one of a pair of terminal means 30 which can project as pins extending from one side of the case or housing 24. The fixed contact 27 can be electrically connected by way of the metal case or housing 24 to the remaining pin or other member of the pair of terminal means 30. The terminal means 30 can establish contactor connection to a pilot-duty device or other relay-type solenoid control to govern supply of electrical energy to the three phase wires 17, 18 and 19 for energization of the stator means. The thermostatic switch means 20 thus can make or break electrical power supply to the polyphase stator means so long as contacts 26–27 are in engagement with each other. A flexible bellows or diaphragm means 31 can abut against an intermediate portion of the flexible arm 28 and a metal extension 32 can be carried on one side of the metal case or housing 24. A metal probe 33 can extend laterally from the extension 32 of the metal case 24 and can include an enlarged tubular portion 34 which terminates in a sealed end 35 and which contains a medium of fluid and the like expandable and contractable in response to increase and decrease of temperature sensed. The probe including the enlarged tubular portion, in effect, provides a capillary tube means including two sections or portions 34A and 34B thereof physically placed to be in proximity to a pair of the multiple windings such as the second and third phase winding portions as outlined in the end view of FIGURE 2. The enlarged tubular or bulb portion 34 of the temperature sensitive actuating member or capillary tube means can be located on the third phase side of the H-shaped insulator means between these phases and thus these two winding portions are subject to sensing of temperature to effect switching control for protection of the polyphase motor.

Figure 2:
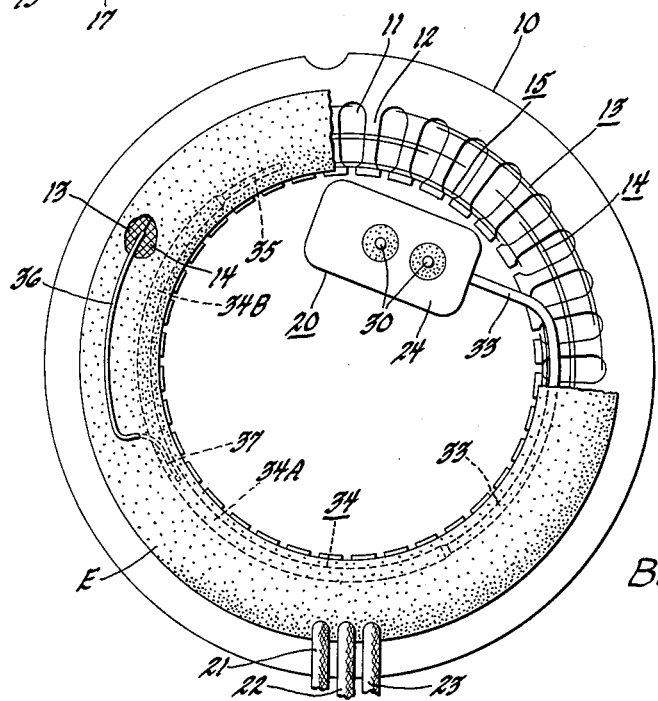
FIGURE 2 is an end view of the arrangement of components of FIGURE 1.

In accordance with the present invention, a bendable solid metal rod or wire-like conductor 36 is secured to an outer periphery of the enlarged tubular portion 34 in a substantially centrally located position such that a joined end of the rod or wire-like conductor 36 is brazed or suitably welded thereto as indicated by reference numeral 37. The end of the rod or conductor 36 that is joined to an outer periphery of the enlarged tubular portion 34 extends substantially parallel to and axially along a side of the enlarged tubular portion 34. The lead connections 21, 22 and 23 are made to a terminal or contact 38 brazed to the metal casing or housing 24, to the tapped connection of rod or conductor 36 and to the sealed end 35, respectively, as shown in the illustration of FIGURE 3. The tapped connection provided by the rod or conductor 36 forms an environment-responsive modifying means secured to the actuating member or temperature sensitive capillary tube means 34 at one end and having a free end of the rod or modifying means 36 fitted into a location radially in between the first and second phase winding portions as indicated in the view of FIGURE 2. Thus, in accordance with the present invention, all of the phase winding portions are provided with temperature and/or electrical current sensing means in proximity thereto including a mid-point connection to the capillary tube means such that metal of the rod or conductor 36 attached to the tubular portion 34 as well as a secondary Y connection or juncture of ends of each of the three coils having at least one of the portions such as 13B, 14B and 15B joined to each other at other than the primary Y connection 16 though electrically having the coils energized when permitted by a single overload protector means effective for more than only a pair of winding portions and more specifically, all of the winding portions of the polyphase stator means. Only a single thermostatic switch means 20 is required for overload protection of the polyphase winding arrangement where previously at least two separate protectors would have been necessary to protect the polyphase motor completely from all conditions of fault and overload. By center-tapping the capillary tube means or enlarged probe portion 34 and making this center tap the Y or mid-point of a portion of the total winding, it is possible to provide adequate overload protection with only one modified protector means. Now this capillary tube means or enlarged probe portion 34 is electrically a part of two of the phase windings or portions thereof with the ability to protect against all combinations of single phase locked rotor conditions in addition to all other faults and overloads provided that an adequate size of overload protector is used.

It is to be noted that the metal casing 24 can be provided with an outwardly extending rib 39 against which a filler means 40 can rest. The filler means includes a tube 41 for supply of temperature sensitive medium to be hermetically sealed in the probe and bellows in a predetermined quantity. It is to be noted that current of differing phases of stator winding means can flow through the metal of the sections of the capillary tube means or enlarged probe portion electrically and physically joined to the metal casing 24 of the single or unitary overload protector means 20.

It is to be noted that the metal case or housing 24 of the thermostatic switch means 20 is fitted in a location inside an inner periphery of the end turns E. The terminal-like member 38 can be carried directly by the metal case 24 or by the probe portion 33. Suitable lacing can be wound around the end turns E and can hold the thermostatic switch means in place. Various thermostatic switch means can be used with a center-tapped temperature sensitive actuating member and environment-responsive modifying means secured thereto for added protective control. The temperature sensitive actuating member together with the environment-responsive modifying means can be fitted between plural main windings as well as a phase winding of a multi-speed dynamoelectric machine. Also a single temperature sensitive actuating member with a tapped connection thereto by an environment-responsive modifying means such as the metal rod or wire-like conductor 36 can be utilized in delta-connected polyphase windings. The divided enlarged probe portion or divided capillary tube means such as 34 can be placed between differing phases of a delta-connected motor and the environment-responsive modifying means or metal rod center-tap connection 36–37 can be fitted into a location between a differing pair of delta-connected phase winding portions of such a dynamoelectric machine. Also, it is to be noted that a single thermostatic switch means could be provided with a pair of capillary tubes for actuating one bellows with a metal case of the thermostatic switch means serving as the mid-point of the winding connections for the Y connection. This also would make each tube an electrical conductor in two different phases of a dynamoelectric machine. It is to be noted that a snap-action diaphragm contact switch actuation can be provided by movement of metal or by an actuating medium therein which expands a tube jacket in response to increase of temperature. The tap connection provided by the rod or wire-like conductor 36 remains fixed as a modifying branch of the actuating system.

Differing thermostatic switch structures can be seen in Patents 2,229,612—Pearce (FIGURES 1 and 8), 2,256,671—Grooms as well as 2,202,165—Pearce and 2,221,633—Dasher all belonging to the assignee of the present invention. Patent 2,786,171—Clark discloses a starting and overload control for split phase electric motors representing further environment in which the subject improvement of this invention could be used. The subject invention also could be adapted to provide a probe having a temperature-responsive expandable medium and an environment-responsive modifying means secured to the actuating member for added protective control as to a switching means utilizing bimetals such as disclosed in Patent 2,593,268—Clark belonging to the assignee of the present invention. The specific internal structure of the thermostatic switching means 20 does not form part of the present invention but it is to be understood that at least a pair of contacts must be provided therein such that a make and break circuit connection can occur therewith to govern power supply for energization of a winding arrangement for a dynamoelectric machine.

The modified protector means provided with features in accordance with the present invention for both current and temperature sensitivity can be used also with the tubular probe and modifying means carried thereby in a single slot sharing turns of at least one or more windings. Use of the device is not limited to concentric windings. In FIGURE 3 an outline of a single stator slot is shown and it is to be understood that the tubular probe as well as the modifying means can be fitted longitudinally or axially therein with the free end of the modifying means extending to either end of the wound stator core. The magnetic core is indicated by a reference C and a slot S thereof with windings W therein as well as the modified overload protector means can be seen in the view of FIGURE 3. The modifying means can have a hollow part also so long as current carrying capacity thereof is sufficient and when placed axially in such as slot only the current sensing feature thereof is utilized whereas both temperature and current sensing characteristics of the tubular probe portion are utilized. The environment-responsive modifying means or wire-like conductor or rod is, in effect, an electrical conductor which together with the tubular probe provides combination temperature and/or electrical current sensing means depending upon physical placement thereof as to the winding arrangement as well as electrical connection thereto. In any event, features in accordance with the present invention achieve a purpose to protect a multi-winding electrical device with only a single overload protector.

With reference to views of FIGURES 1 and 3, it is to be understood that the number of circuits can vary to include more than two coil portions each optionally connectable to separate common connections or Y junctures, but at least one lead is brought individually to various parts of the modified overload protector device in accordance with current carrying capacity thereof. Thus, a fractional amount of electrical energy such as a quarter of the total current in four coil portions, for example, can be caused to pass through the tubular portion and modified means therewith. In other words, there can be, for example, three coil portions equivalent to those labeled 13A, 14A and 15A connected to a common juncture such as 16 whereas one additional coil portion such as 13B, 14B and 15B can be joined to an auxiliary common juncture. Similarly, in accordance with current carrying capacity of the modified overload protector device, it would be possible to have more than one of such coil portions joined to an auxiliary common juncture and the view of FIGURE 3 schematically represents a winding arrangement in which one of four such connections of thet winding arrangement can be connected to various components of the modified overload protector means. There is no limit as to the number of physical or electrical poles provided in a dynamoelectric machine fitted with such modified overload protector means and improved features in accordance with the present invention can be provided on any standard induction motor, single-phase, two-phase, three-phase and other polyphase arrangements. The specific number of coil portions such as 13A and 13B identified in FIGURE 1 are provided for purposes of illustration for separate circuits in the winding arrangement and in no way represent electrical poles.

While the embodiments of the present invention as herein disclosed constitute preferred forms, it is to be understood that other forms might be adopted.

What is claimed is as follows:

1. For improved overload protection of a polyphase dynamoelectric machine, a stator component assembly, comprising, a laminated stator core having radially extending slots therein fitted with a multi-phase winding arrangement of which each phase is wound with a pair of conductors in parallel at differing slot depth locations and all having opposite physical end turns projecting from said core, a single thermostatic switch means carried radially inwardly of the end turns on one side of said core and having a metal case as well as cooperable contacts therein, a structurally and electrically continuous temperature sensitive actuating member in physical proximity to the winding arrangement and carried to one side of and electrically joined to said case, and one auxiliary modifier secured directly to said actuating member intermediately thereof to fit further in proximity to remaining winding arrangement to include all phases for protection against not only combinations of single phase locked rotor conditions but also additional conditions of fault and overload individual in any one of the phases though requiring only one thermostatic switch means.

2. The assembly of claim 1 wherein said machine has a three phase winding arrangement of which each phase is wound series Y with only one conductor from each phase connected to a separate Y by direct electrical connection adjacent to opposite ends of said actuating member as well as substantially centrally thereof to said auxiliary modifier.

3. For overload protection in a polyphase dynamoelectric machine such as a motor having only a single thermostatic switch means including a pair of make-break electrical contacts at least one of which is movable in response to change of temperature sensed by a structurally and electrically continuous metal probe attached to the switch means thus having common electrical connection therewith as well as having an enlarged unitary tubular portion fitted physically in proximity to some of the end turns of polyphase winding means, the improvement which comprises a rod-like auxiliary portion connected directly and electrically to said enlarged unitary tubular portion substantially centrally thereof and located to fit in proximity to remaining end turns of said polyphase winding means.

4. The improvement of claim 3 wherein said polyphase winding means has three phases each wound electrically series Y with a pair of conductors placed physically in parallel and modified by having only one of these conductors from each phase connected to a separate Y juncture through said switch means and probe including said enlarged tubular portion as well as said rod-like auxiliary portion attached thereto, there being a power line connection to each phase in a location between conductors of each phase.

5. For use in overload protection of a dynamoelectric machine having multiple windings fitted into a slot of a magnetic stator core, a single thermostatic switch means having a structurally and electrically continuous tubular probe extending therefrom, and a wire-like conductor attached directly to an intermediate location along said probe as a modifying means for actuation of the thermostatic switch means, said probe and wire-like conductor being fitted axially into a stator slot and being connected to predetermined winding portions for combination electrical current and temperature sensing overload operation.

6. In claim 5, said windings having at least a pair of series connected portions connectible in part to an auxiliary common juncture therebetween, said probe and wire-like conductor thus each carrying at least a fractional amount of current through said windings.

References Cited by the Examiner

UNITED STATES PATENTS

| | | | |
|---|---|---|---|
| 2,369,986 | 2/45 | Schaefer | 318—473 |
| 2,707,763 | 5/55 | Kurtz | 318—473 X |
| 2,712,083 | 6/55 | Armstrong | 318—473 X |

MILTON O. HIRSHFIELD, *Primary Examiner.*